US012005556B2

(12) United States Patent
Shiina et al.

(10) Patent No.: US 12,005,556 B2
(45) Date of Patent: Jun. 11, 2024

(54) DRIVING WORK MACHINE

(71) Applicant: Koki Holdings Co., Ltd., Tokyo (JP)

(72) Inventors: Kento Shiina, Ibaraki (JP); Takahiro Ookubo, Ibaraki (JP); Satoshi Abe, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 154 days.

(21) Appl. No.: 17/434,323

(22) PCT Filed: Mar. 6, 2020

(86) PCT No.: PCT/JP2020/009808
§ 371 (c)(1),
(2) Date: Aug. 26, 2021

(87) PCT Pub. No.: WO2020/195725
PCT Pub. Date: Oct. 1, 2020

(65) Prior Publication Data

US 2022/0161406 A1 May 26, 2022

(30) Foreign Application Priority Data

Mar. 28, 2019 (JP) ................................ 2019-062892

(51) Int. Cl.
*B25D 16/00* (2006.01)
*B25D 17/24* (2006.01)

(52) U.S. Cl.
CPC ........... *B25D 16/006* (2013.01); *B25D 17/24* (2013.01); *B25D 2211/006* (2013.01);
(Continued)

(58) Field of Classification Search
CPC ...... B25D 16/00; B25D 16/006; B25D 17/24; B25D 2211/006; B25D 2211/061;
(Continued)

(56) References Cited

U.S. PATENT DOCUMENTS 4,236,588 A * 12/1980 Moldan ................ B25D 16/006
74/22 A
4,349,074 A * 9/1982 Ince ..................... B25D 16/006
173/48

(Continued)

FOREIGN PATENT DOCUMENTS

CN 101844345 A 9/2010
CN 106041833 A 10/2016

(Continued)

OTHER PUBLICATIONS

International Search Report issued in PCT/JP2020/009808, dated May 26, 2020 w/English Translation.

(Continued)

*Primary Examiner* — Robert F Long
*Assistant Examiner* — Eduardo R Ferrero
(74) *Attorney, Agent, or Firm* — Rimon P.C.

(57) ABSTRACT

A workability of a driving work machine is improved by reduction in vibration transmitted to a housing. A driving work machine 10 includes: a cylinder 21 applying a rotational force to a tip tool; a piston 33 applying a striking force to the tip tool; a driving source generating a power; a switching part 61 making switching between at least two operational states including a rotational striking state of transmitting the power as a striking force and a rotational force to the tip tool and a rotational state of transmitting the power as the rotational force but not transmitting the power as the striking force to the tip tool; and a housing 12. The cylinder 21 includes a pushing part 46 pushing the switching part 61 rearward, the switching part 61 is able to switch an operational state of the cylinder 21 by the rearward movement caused by the pushing force of the pushing part 46, and a rubber annular member 72 serving as an anti-vibration part (Continued)

is arranged between the pushing part 46 and the preventing part 71.

11 Claims, 12 Drawing Sheets

(52) U.S. Cl.
CPC .................. *B25D 2211/061* (2013.01); *B25D 2216/0023* (2013.01); *B25D 2216/0038* (2013.01); *B25D 2222/57* (2013.01)

(58) Field of Classification Search
CPC .... B25D 2216/0023; B25D 2216/0038; B25D 2222/57; B25D 2211/068
See application file for complete search history.

(56) References Cited

U.S. PATENT DOCUMENTS

| | | | | | |
|---|---|---|---|---|---|
| 4,567,950 | A * | 2/1986 | Fushiya | B25D 16/006 | 173/104 |
| 4,763,733 | A * | 8/1988 | Neumaier | B25D 16/006 | 173/48 |
| 4,825,961 | A * | 5/1989 | Neumaier | B25D 16/006 | 173/109 |
| 5,456,324 | A * | 10/1995 | Takagi | B25D 16/006 | 173/48 |
| 6,152,242 | A * | 11/2000 | Chung | B25D 16/00 | 173/48 |
| 6,223,833 | B1 | 5/2001 | Thurler et al. | | |
| 6,789,630 | B2 * | 9/2004 | Quirijnen | B25F 5/001 | 173/114 |
| 6,913,090 | B2 * | 7/2005 | Droste | B25D 16/00 | 475/900 |
| 7,051,820 | B2 * | 5/2006 | Stirm | B25D 16/003 | 173/109 |
| 7,753,135 | B2 * | 7/2010 | Lennartz | B25D 11/062 | 173/48 |
| 8,286,724 | B2 | 10/2012 | Furusawa et al. | | |
| 9,227,312 | B2 * | 1/2016 | Wang | B25D 16/006 | |
| 2004/0108123 | A1 * | 6/2004 | Shibata | B25D 16/006 | 173/201 |
| 2004/0211574 | A1 * | 10/2004 | Droste | B25D 16/006 | 173/29 |
| 2006/0108133 | A1 * | 5/2006 | Yamazaki | B25D 11/125 | 173/104 |
| 2007/0125563 | A1 * | 6/2007 | Furusawa | B25D 16/006 | 173/48 |
| 2008/0271905 | A1 * | 11/2008 | Yoshikane | B25D 16/006 | 173/109 |
| 2010/0218965 | A1 * | 9/2010 | Guenther | B25D 16/006 | 192/66.1 |
| 2010/0236801 | A1 * | 9/2010 | Furusawa | B25D 11/10 | 173/162.2 |
| 2012/0255752 | A1 * | 10/2012 | Aoki | B25D 16/006 | 173/48 |
| 2015/0328764 | A1 * | 11/2015 | Yoshikane | B25F 5/02 | 173/104 |
| 2016/0151905 | A1 * | 6/2016 | Tada | B25D 17/043 | 173/210 |
| 2017/0106518 | A1 * | 4/2017 | Takeuchi | B25F 5/006 | |
| 2017/0252915 | A1 * | 9/2017 | Furusawa | B25D 11/062 | |
| 2017/0355070 | A1 * | 12/2017 | Ohlendorf | B25D 11/062 | |
| 2018/0001463 | A1 * | 1/2018 | Furusawa | B25D 17/24 | |
| 2019/0291255 | A1 * | 9/2019 | Yoshikane | B25D 16/006 | |
| 2020/0078918 | A1 * | 3/2020 | Yoshikane | B25D 17/043 | |

FOREIGN PATENT DOCUMENTS

| | | | |
|---|---|---|---|
| DE | 102016004193 | A1 | 10/2016 |
| GB | 2154497 | A | 9/1985 |
| GB | 2234464 | A | 2/1991 |
| JP | 2003-025250 | A | 1/2003 |
| JP | 2004-130473 | A | 4/2004 |
| JP | 2009-241195 | A | 10/2009 |
| JP | 2016-198829 | A | 12/2016 |

OTHER PUBLICATIONS

Extended European Search Report issued in corresponding European Application No. 20779431.4, dated Dec. 21, 2022 (8 pages).
Office Action received in Chinese Patent Application No. 202080016022.0 dated Oct. 27, 2023.

* cited by examiner (A)

(B)

(A)

(B)

(C)

21: CYLINDER
33: PISTON
46: PUSHING UNIT
61: SWITCHING MEMBER
71: PREVENTING MEMBER
72: ANNULAR MEMBER (ANTI-VIBRATION UNIT)

DRIVING WORK MACHINE

CROSS REFERENCE TO RELATED APPLICATIONS

This application is the U.S. National Phase under 35 U.S.C. § 371 of International Application No. PCT/JP2020/009808, filed on Mar. 6, 2020, which claims the benefit of Japanese Application No. 2019-062892, filed on Mar. 28, 2019, the entire contents of each are hereby incorporated by reference.

TECHNICAL FIELD

The present invention relates to a driving work machine that performs a punching work or others to a workpiece by using a tip tool to apply a striking force to the workpiece.

BACKGROUND ART

Such a driving work machine is used to perform a punching work or others while using a tip tool to apply a striking force to a workpiece, and is also called hammer drill. The driving work machine has at least two work modes that are a drill mode that is a rotational mode and a rotational striking mode that is a hammer drill mode. In the drill mode, the machine performs the punching work by using the tip tool to transmit not the striking force but only the rotational force to the tip tool. In the hammer drill mode, the machine performs the punching work by applying the impact force to the workpiece while rotating the tip tool.

As described in a Patent Document 1, the driving work machine includes a striking element that is called a striker applying the striking force to the tip tool and a piston driving the striking element through a pneumatic pressure, and the striking element and the piston are embedded into a metallic cylinder. A second hammer that is an intermediate element that is driven by the striking element is embedded into the cylinder, and the striking force of the striking element is transmitted through the intermediate element to the tip tool attached to an end of the cylinder. The striking element, the intermediate element, the piston and the cylinder configure a striking mechanism. The cylinder is arranged in an inner case made of a metallic holder or case, and the inner case configures a part of a housing of the driving work machine.

RELATED ART DOCUMENT

Patent Document

Patent Document 1: Japanese Patent Application Laid-Open Publication No. 2009-241195

SUMMARY OF THE INVENTION

Problems to be Solved by the Invention

At the time of the work using the driving work machine to apply the striking force to the workpiece, the striking element collides with a rear end surface of the intermediate element, so that the striking force is transmitted to the tip tool. The striking force applied from the tip tool to the workpiece is returned as a counteractive impact force from the workpiece to the intermediate element, and vibration applied to the tip tool is transmitted to the inner case. The inner case and the cylinder are embedded in a gear housing, the gear housing is connected to a motor housing, and the motor housing is provided with a handle.

Therefore, when the vibration applied to the tip tool is transmitted to the inner case, the vibration of the inner case is transmitted to the handle through the motor housing, and then, the vibration is applied to an operator's hand(s), and therefore, the workability is reduced.

A purpose of the present invention is to improve the workability of the driving work machine by reducing the vibration transmitted to the housing.

Means for Solving the Problems

A driving work machine of the present invention includes: a cylinder configured to apply a rotational force to a tip tool; a piston attached to be able to reciprocate in an axis direction inside the cylinder and configured to apply a striking force to the tip tool; a driving source configured to generate a power for driving the cylinder and the piston; a switching part configured to make switching between at least two operational states including a rotational striking state of transmitting the power as a striking force and a rotational force to the tip tool and a rotational state of transmitting the power as the rotational force but not transmitting the power as the striking force to the tip tool; a housing configured to house the cylinder, the driving source and the switching part; and a spring member arranged between the housing and the switching part and configured to urge the switching part to move forward. The cylinder includes a pushing part pushing the switching part rearward when the cylinder is moved rearward by a reactive force of the pressing of the tip tool against a workpiece, the switching part is able to switch an operational state of the cylinder by using the rearward movement caused by the pushing force of the pushing part, the housing includes a preventing part configured to prevent an amount of the rearward movement of the switching part, and an anti-vibration part is arranged at least either between the pushing part and the switching part or between the switching part and the preventing part.

Effects of the Invention

The cylinder that rotationally drives the tip tool is provided with the piston applying the striking force to the tip tool, and the striking force applied from the tip tool to the workpiece is returned as a counteractive force from the workpiece to the cylinder. However, since the anti-vibration part is arranged between the pushing part provided in the cylinder and the preventing part of the housing, the vibration and the impact force transmitted from the cylinder to the housing are reduced by the anti-vibration part. Since the vibration and the impact force transmitted to the housing are reduced, the workability of the driving work machine that is used when the operator performs the work while holding the handle can be improved.

BRIEF DESCRIPTIONS OF THE DRAWINGS

BEST MODE FOR CARRYING OUT THE INVENTION

Figure 1:
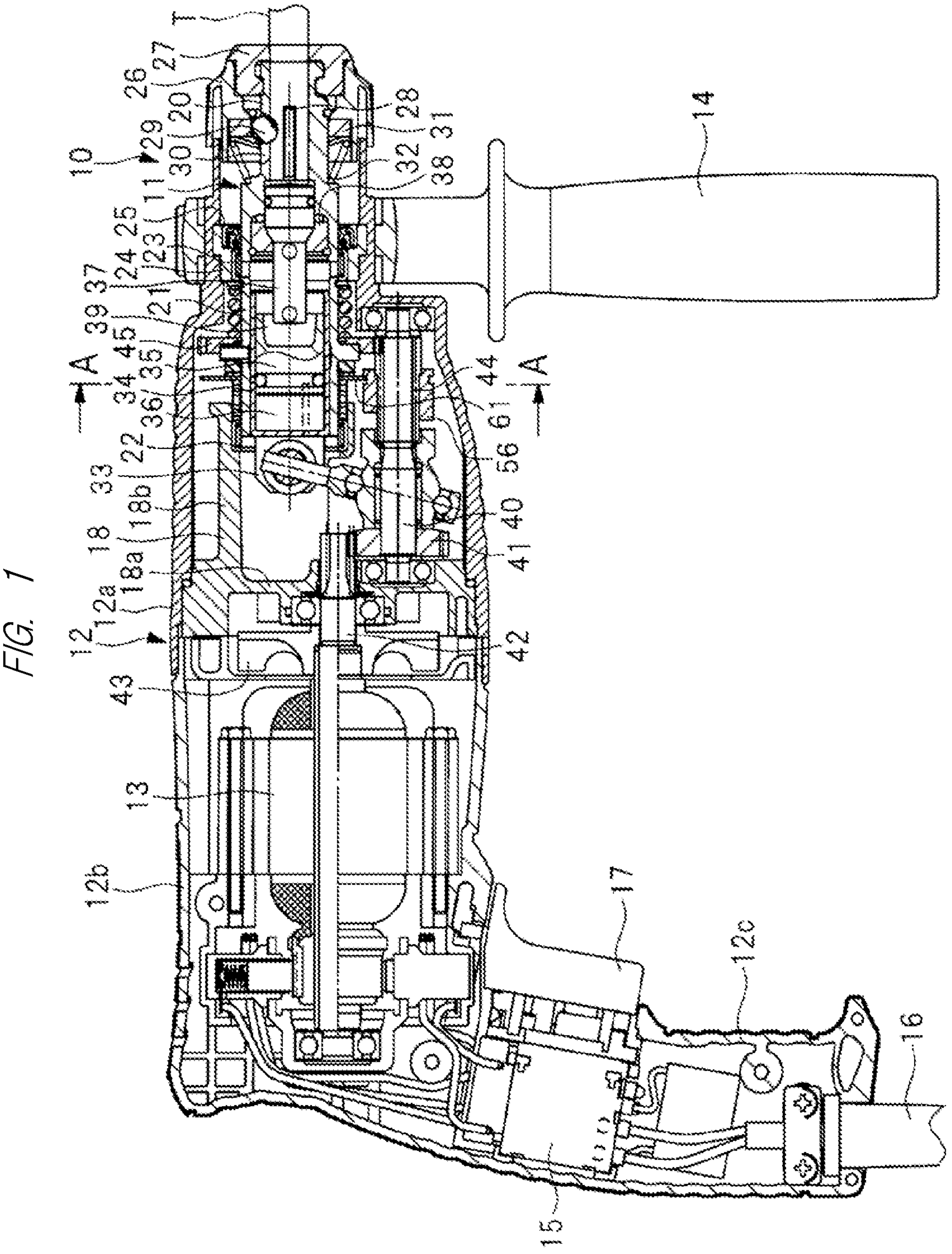
FIG. 1 is a vertical cross-sectional view showing a driving work machine according to an embodiment.

Hereinafter, embodiments of the present invention will be described in detail with reference to the accompanying drawings. As shown in FIG. 1, a driving work machine 10 includes a gear housing 12*a* that houses a striking mechanism 11 and a motor housing 12*b* that houses an electric motor 13 serving as a driving source for driving the striking mechanism 11. The motor housing 12*b* is provided with a handle part 12*c*, and an operator performs a punching work, a breaking-up work and others using the driving work machine 10 while holding the handle part 12*c*.

The gear housing 12*a*, the motor housing 12*b* and the handle part 12*c* configure a housing 12 of the driving work machine 10. When the gear housing 12*a* is assumed to be a front end of the driving work machine 10, the motor housing 12*b* is arranged at a rear end of the gear housing 12*a*. The handle part 12*c* that is arranged at a rear end of the motor housing 12*b* is almost at a right angle with respect to the motor housing 12*b*.

A sub handle 14 is attached to a front end of the gear housing 12*a*. The operator can perform such a work while holding the handle part 12*c* with his/her one hand and holding the sub handle 14 with the other hand, and also can perform such a work while holding only the handle part 12*c*.

A switch mechanism 15 is housed in the handle part 12*c*, and the switch mechanism 15 is connected to an external power supply by a power cable 16. When a trigger 17 connected to the switch mechanism 15 is operated, the power is supplied to the electric motor 13.

An inner case 18 is attached into the gear housing 12*a*. The inner case 18 has a radial-directional wall 18*a* fixed to the gear housing 12*a* and an axis-directional supporting part 18*b* protruding forward together with the radial-directional wall 18*a*. A cylinder 21 is attached to the axis-directional supporting part 18*b* of the inner case 18 to be movable and rotatable in the axis direction, and the cylinder 21 has a step form having a front end, a diameter of which is smaller than that of a rear end. The rear end of the cylinder 21 is supported by bearings 22 and 23, and the bearing 22 is attached to the inner case 18 while the bearing 23 is attached to a support ring 24 fixed to the gear housing 24. A sealing member 25 is mounted between the support ring 24 and the cylinder 21 so that entering of foreign substances such as dusts is suppressed.

A tool holding part 26 is attached to the front end of the cylinder 21, and the tool holding part 26 is mounted to the front end of the gear housing 12*a* to be movable. A rubber or a resin holding ring 27 is fitted with a gap between the tool holding part 26 and the front end of the cylinder 21, and a tip tool "T" is detachably mounted into a tool fitting part 20 arranged at the front end of the cylinder 21. A protrusion 28 that engages with a groove formed in the tip tool T to extend in the axis direction is arranged in the tool fitting part 20 of the cylinder 21. Further, a ball 29 that engages with a concave portion formed in the tip tool T is mounted to the cylinder 21. The ball 29 is stored in a storage groove 30 formed in the cylinder 21, and protrudes into the tool fitting part 20. An outside of the ball 29 is held by a ring 31, and a spring force in a direction heading to the tip tool T is applied to the ball 29 by a spring member 32. When the tip tool T is inserted into or detached from the front end of the cylinder 21, the spring force is applied as a damping force to the tip tool T.

A piston 33 is mounted into the rear end of the cylinder 21 to be able to reciprocate in the axis direction, and the piston 33 is provided with a capped cylindrical portion 34. A striker that is a striking element 35 is embedded into the cylindrical portion 34, and an air chamber 36 is made of the striking element 35 and the cylindrical portion 34. A second hammer that is an intermediate element 37 is fixed into the cylinder 21 by a fixing ring 38. A rear end of the intermediate element 37 is inserted into a concave portion 39 formed at a front end of the striking element 35. The cylinder 21, the piston 33, the striking element 35 and the intermediate element 37 configure the striking mechanism 11 for applying the rotational force and the striking force to the tip tool T.

Figure 2:
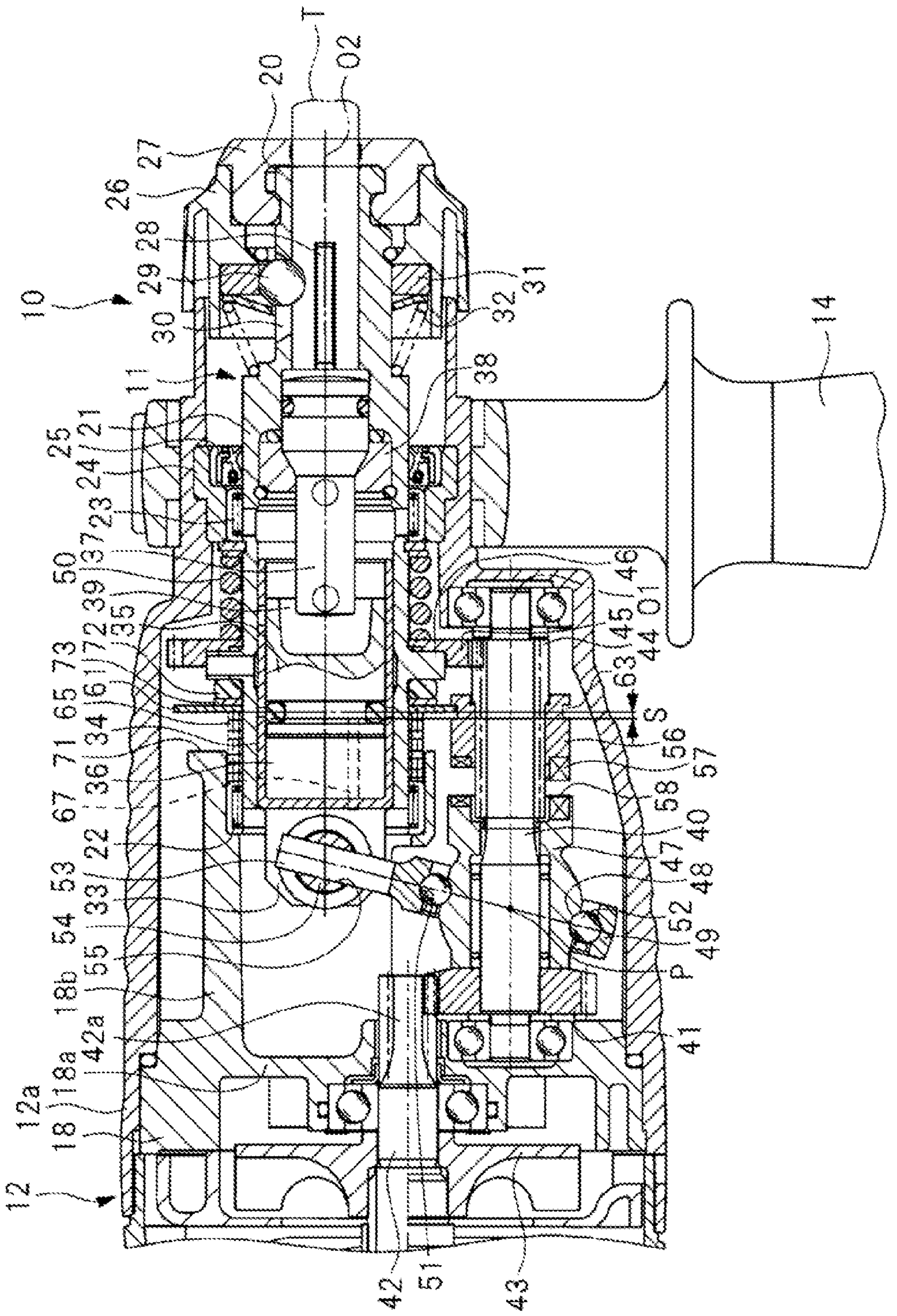
FIG. 2 is an enlarged cross-sectional view showing a principal part of FIG. 1.

As shown in FIG. 2, a driving shaft 40 is mounted to the gear housing 12*a* to be rotatable and in parallel to a center axis of the cylindrical part 34, and an input gear 41 that is attached to a rear end of the driving shaft 40 meshes with an output gear 42*a* that is attached to an output shaft 42 of the electric motor 13. A fan 43 is attached to the output shaft 42 so that the electric motor 13 is cooled by cooling wind generated by the fan 43. A front end of the driving shaft 40 is provided with a driving gear 44, and the driving gear 44 meshes with a follower gear 45 that is attached to the cylinder 21. The follower gear 45 is mounted to a region of a front surface of a pushing part 46 made of a flange arranged in the cylinder 21, and a pushing force is applied to the follower gear 45 in a direction heading toward the pushing part 46 by a compression coil spring 50.

When the output shaft 42 is driven by the electric motor 13, the driving shaft 40 is driven to rotate around a rotational center axis O1, and the cylinder 21 is driven to rotate around a rotational center axis O2. In this manner, the rotational force is transmitted to the tip tool T. As described above, the driving shaft 40, the driving gear 44, the input gear 41 and the follower gear 45 configure a power transmitting part using the driving force of the electric motor 13 to transmit the rotational force to the cylinder 21, and the tip tool T is rotationally driven to rotate by the cylinder 21.

An axis-directional dimension of the driving gear 44 is longer than an axis-directional dimension of the follower gear 45 as shown in FIG. 2. In this manner, even when the cylinder 21 moves in the axis direction, the meshing between the driving gear 44 and the follower gear 45 is maintained.

A motion converting member 47 made of a spherical cam is mounted to the driving shaft 40 to be rotatable through a bearing, and a guide groove 48 that inclines to the rotational center axis O1 is formed in an outer circumferential surface of the motion converting member 47. A follower ring 49 is arranged outside the motion converting member 47, and a ball 52 is mounted to a gap between the guide groove 48 and a guide groove 51 that is formed in an inner circumferential surface of the follower ring 49. A driving rod 53 is fixed to the follower ring 49, and a rotational piece 54 that rotates around rotational center axis at a right angle with respect to a reciprocating direction of the piston 33 is attached to the piston 33. The driving rod 53 is fitted to be able to swing to a guide hole 55 that is arranged in the rotational piece 54 in a radial direction.

A cylindrically-shaped clutch 56 is mounted to the driving shaft 40 to be able to swing in the axis direction, and the clutch 56 rotates together with the driving shaft 40. A mesh part 57 is arranged in the clutch 56, and a mesh part 58 is arranged in the motion converting member 47 to correspond to this mesh part 57. In this manner, when the mesh part 57 and the mesh part 58 are meshed with each other by movement of the clutch 56 in the axis direction toward the motion converting member 47, the rotation of the driving shaft 40 is transmitted to the motion converting member 47 through the clutch 56. On the other hand, when the meshing is released, the transmission of the power to the motion converting member 47 is cut.

Therefore, when the driving shaft 40 is driven to rotate by the electric motor 13 to rotationally drive the motion converting member 47, the driving rod 53 swings around a center point "P" of the motion converting member 47, and the piston 33 is driven in the axis direction. In this manner, the rotational force of the driving shaft 40 is converted into the reciprocation force for the piston 33. When the piston 33 is driven toward a front side of the driving work machine 10, air in the air chamber 36 is compressed, and the striking element 35 is driven by the compressed air. When the striking element 35 is driven forward, the intermediate element 37 is driven by the striking element 35, and the impact force is applied to the tip tool T. Therefore, the driving shaft 40, the motion converting member 47 and the driving rod 53 configure a motion transmitting part that can transmit the forward striking force to the tip tool T by using the driving force of the electric motor 13.

Figure 3:
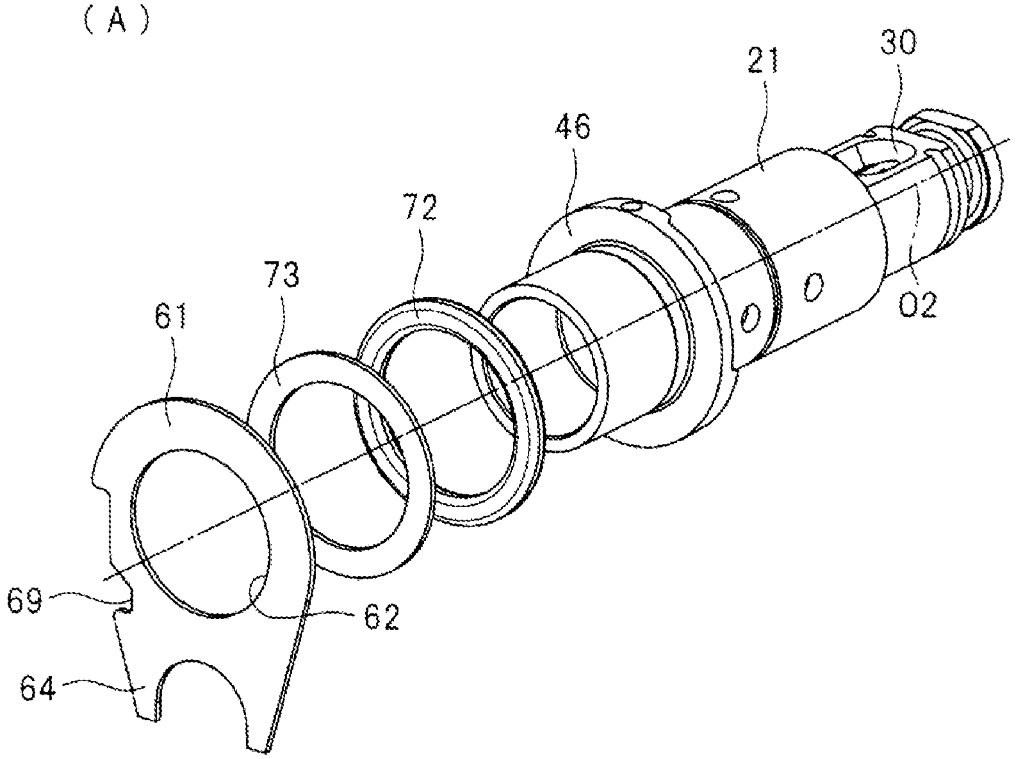
FIG. 3(A) is an exploded perspective view of a cylinder and a switching member shown in FIGS. 1 and 2.
FIG. 3(B) is a perspective view in a view from an opposite side of FIG. 3(A)
Figure 3:
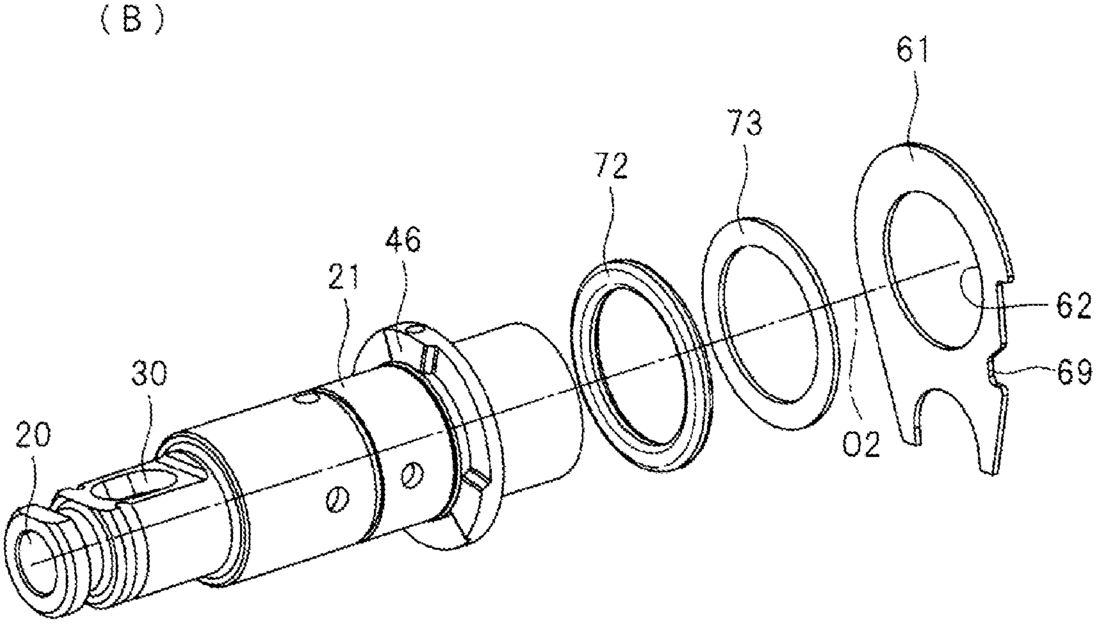

Outside the rear end of the cylinder 21, a switching member 61 made of a thrust plate that is a plate member is mounted to be movable with respect to the cylinder 21 in the axis direction. As shown in FIG. 2, the switching part that is the switching member 61 is positioned between the front end surface of the inner case 18 and the pushing part 46, and extends in a direction that is orthogonal to the rotational center axis O2 of the cylinder 21. As shown in FIG. 3, a fitting hole 62 that fits with the cylinder 21 is formed in the switching member 61, and the fitting hole 62 is swings in contact with the outer circumferential surface of the cylinder 21.

As shown in FIG. 2, an annular groove 63 is formed in the clutch 56. In the switching member 61, an arc-shaped engaging part 64 that is inserted into this annular groove 63 is formed as shown in FIG. 3. In order to urge a spring force to the switching member 61 in a direction heading to the front side of the cylinder 21, a return spring member 65 is arranged between the switching member 61 and the inner case 18 as shown in FIG. 2. Therefore, when a thrust load is not applied to the cylinder 21 in a direction of pushing the cylinder, the cylinder 21 is at a forward limit position as shown in FIG. 2.

In this case, the meshing part 57 of the clutch 56 is distant from the meshing part 58 of the motion converting member 47, and the rotational motion of the output shaft 42 of the electric motor 13 is not transmitted to the motion converting member 47 while the rotational motion is transmitted to only the cylinder 21 by the follower gear 45 meshing with the driving gear 44. Therefore, the driving work machine 10 is in the rotational state of rotationally driving the tip tool T. A rotational state of transmitting the rotational force but not transmitting the striking force to the tip tool is a rotational mode that is a drill mode.

On the other hand, when the meshing part 58 is meshed with the meshing part 57 by the pushing of the clutch 56 to the motion converting member 47, the rotational motion of the output shaft 42 is transmitted to the cylinder 21 and is also transmitted to the motion converting member 47. Because of the rotational driving of the motion converting member 47, the driving rod 53 swings around the swing center point P, and the piston 33 reciprocates in the axis direction. In this manner, the driving work machine 10 rotationally drives the tip tool T, and besides, is in a rotational striking state of applying the striking force. The rotational striking state of transmitting the rotational force and the striking force to the tip tool is a striking rotational mode that is a hammer drill mode.

Figure 4:
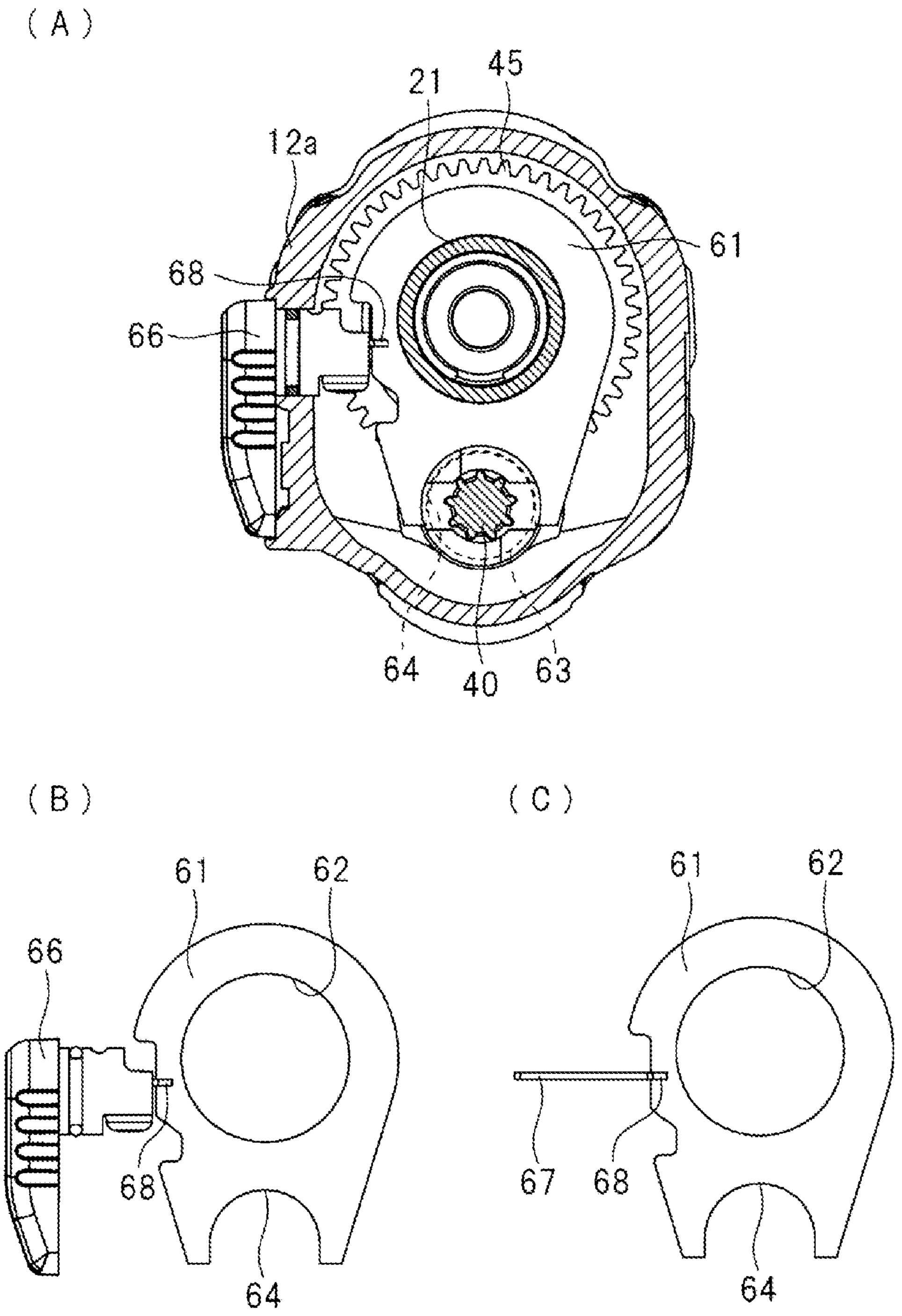
FIG. 4(A) is an enlarged cross-sectional view of FIG. 1 in a direction of a line A-A, showing a switch lever set to be in a drill mode.
FIG. 4(B) is a diagram showing a positional relation between the switch lever and the switching member in FIG. 4(A)
FIG. 4(C) is a diagram showing a positional relation between a mode setting plate and the switching member in FIG. 4(A)
Figure 5:
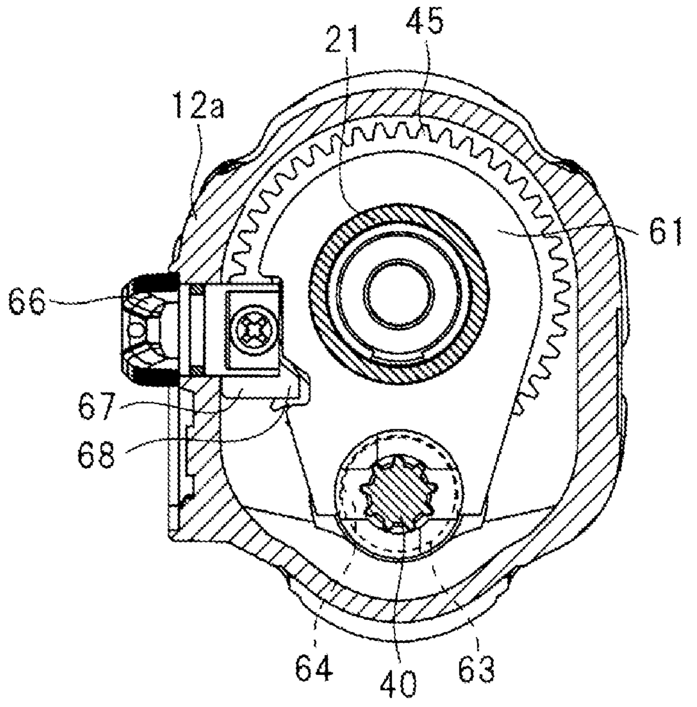
FIG. 5(A) is an enlarged cross-sectional view of FIG. 1 in the direction of the line A-A, showing a switch lever set to be in a hammer drill mode.
FIG. 5(B) is a diagram showing a positional relation between the switch lever and the switching member in FIG. 5(A)
FIG. 5(C) is a diagram showing a positional relation between the mode setting plate and the switching member in FIG. 5(A)
Figure 5:
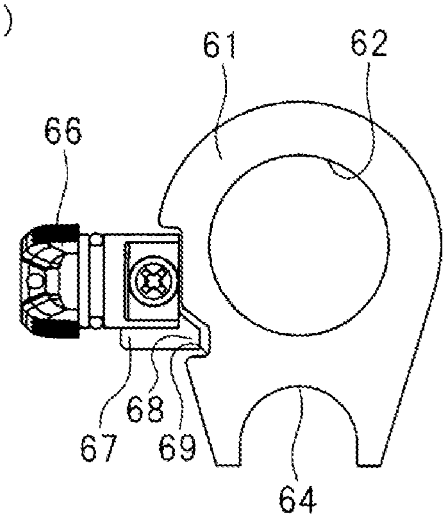
Figure 5:
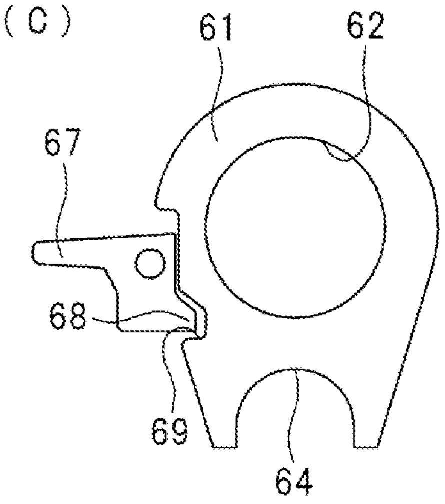

Each of FIGS. 4(A) and 5(A) is an enlarged cross-sectional view in a direction of a line A-A of FIG. 1, and a switch lever 66 for switching the driving work machine 10 to be in either the drill mode or the hammer drill mode is arranged outside the gear housing **12*a* to be rotatable. The switch lever 66 is operated by an operator. FIG. 4 shows a state in which the switch lever 66 is almost at a right angle to the rotational center axis O2 to be operated in the drill mode. FIG. 5 shows a state in which the switch lever 66** is rotated by almost 90 degrees from a position of the drill mode and is almost in parallel to the rotational center axis O2 to be operated in the hammer drill mode.

A mode setting plate 67 is attached to the switch lever 66. As shown in FIGS. 4 and 5, the mode setting plate 67 has an engaging protrusion 68. By the operation for the switch lever 66 to be in the drill mode as shown in FIG. 4, the engaging protrusion 68 is engaged with the switching member 61. In this manner, even when a load is applied to the cylinder 21 in a direction of recessing this, the clutch 56 and the motion converting member 47 are prevented from meshing with each other.

On the other hand, by the operation for the switch lever 66 to be in the hammer drill mode as shown in FIG. 5, the mode setting plate 67 is brought into parallel to the switching member 61. An engagement avoiding groove 69 is formed in the switching member 61 so that the switching member 61 that is operated in the hammer drill mode can move without being engaged with the engaging protrusion 68. Therefore, by the application of the load to the cylinder 21 in the recession direction, the switching member 61 is moved toward the inner case 18 without being engaged with the mode setting plate 67. In this manner, the clutch 56 meshes with the motion converting member 47, so that the tip tool T is rotationally driven and is reciprocated in the axis direction by the electric motor 13.

A front end surface of the axis-directional supporting part 18*b* of the inner case 18 is a preventing part 71 on which the switching member 61 abuts, and the switching member 61 abuts on the preventing part 71 when the load heading rearward is applied to the cylinder 21. In this manner, an amount of the rearward movement of the switching member 61 is prevented when the switching member 61 abuts on the preventing part 71.

A rubber annular member 72 is arranged as an anti-vibration part in a gap between the pushing part 46 and the preventing part 71, the gap also being between the switching member 61 and the pushing part 46, and a thrust washer 73 is arranged between the annular member 72 and the switching member 61. In the arrangement of the rubber annular member 72 serving as the anti-vibration part between the pushing part 46 and the preventing part 71 that is the front end surface of the inner case 18 as described above, the impact vibration of the cylinder 21 is moderated by the annular member 72, and the switching member 61 is in contact with the preventing part 71 even when the switching member 61 made of the thrust plate collides with the preventing part 71 at the time of the reciprocation that is the vibration of the cylinder 21 in the axis direction as described in the hammer drill mode.

The cylinder 21 is a vibration generating source of the driving work machine 10 in the hammer drill mode. When the vibration generating source transmits the vibration to the inner case 18, the inner case 18 configuring a part of the housing 12 transmits the vibration to the handle part 12*c* and the sub handle 14. Therefore, the vibration is applied to an operator's hand (s) holding the handle part 12*c*, and therefore, the reduction in the workability cannot be avoided.

On the other hand, as shown in FIG. 2, by the arrangement of the anti-vibration part made of the annular member 72, the vibration transmitted from the vibration generating source to the housing 12 through the inner case 18 is reduced, and therefore, the workability and the operability of the driving work machine 10 can be improved.

Next, the punching work using the driving work machine 10 in the drill mode and the punching work using the same in the hammer drill mode of rotating the tip tool while using the tip tool to apply the impact force to the workpiece will be explained.

(Drill Mode)

When the driving work machine 10 is not driven while the switch lever 66 is operated to be in the driver mode as shown in FIG. 4 so that the mode setting plate 67 is almost in parallel to the rotational center axis O2, the end surface of the mode setting plate 67 is positioned to be behind the switching member 61 across a space "S" as shown with a dotted line in FIG. 2. Since there is the space S under this state, the operator can easily rotationally operate the switch lever 66 to make the switching between the hammer drill mode shown in FIG. 5 and the drill mode shown in FIG. 4.

Figure 6:
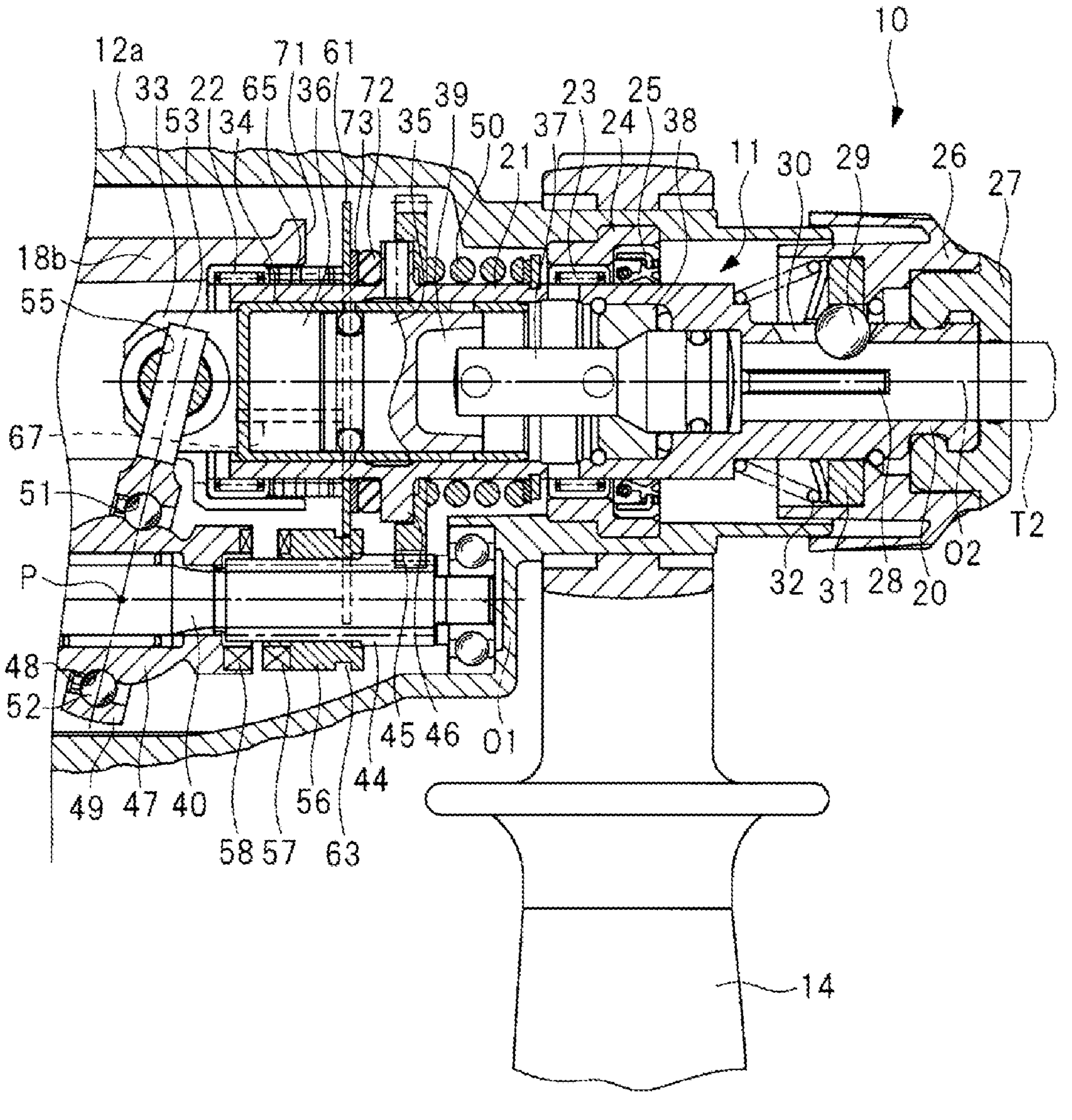
FIG. 6 is a cross-sectional view showing an application state of a load to the cylinder that has been pushed by a tip tool in a state in which the drill mode is set.

When the tip tool T is pressed against the workpiece in the state in which the drill mode is set as shown in FIG. 2, the rearward load is applied to the cylinder 21 by a reaction force of the pressing of the tip tool T against the workpiece. By the application of the load to the cylinder 21, the switching member 61 is moved rearward to abut on the mode setting plate 67 as shown with a dotted line in FIG. 6. At this stage, as shown in FIG. 2, the clutch 56 does not mesh with the meshing part 58 of the motion converting member 47 as similar to the case without the application of the load to the cylinder 21. Therefore, the rotational force of the driving shaft 40 that is rotationally driven by the output shaft 42 of the electric motor 13 is not transmitted to the motion converting member 47, and is transmitted to only the cylinder 21. By the rotation of the cylinder 21, the annular member 72 and the thrust washer 73 rotate together with the cylinder 21, and the thrust washer 73 swings with respect to the switching member 61.

When the tip tool T is rotationally driven by the rotation of the cylinder 21 as described above, the punching work using the tip tool can be performed. At the time of this punching work, the vibration that is transmitted from the tip tool to the cylinder 21 is absorbed by the rubber annular member 72 arranged between the pushing part 46 and the switching member 61, and the vibration that is transmitted from the switching member 61 to the housing 12 through the return spring member 65 and the inner case 18 is damped. In this manner, the vibration that is transmitted to the operator's hand(s) holding the handle part 12*c* is reduced, so that the workability of the driving work machine 10 can be improved.

(Hammer Drill Mode)

On the other hand, in the work in the hammer drill mode, the switch lever 66 is operated to be at the position of the hammer drill mode by the operator as shown in FIG. 5. By the operation for the switch lever 66 to be in the hammer drill mode, the mode setting plate 67 is oriented to be along the switching member 61 as shown in FIG. 5. In this manner, the engaging protrusion 68 of the mode setting plate 67 is to be at a position at which this does not interfere with the switching member 61.

Figure 7:
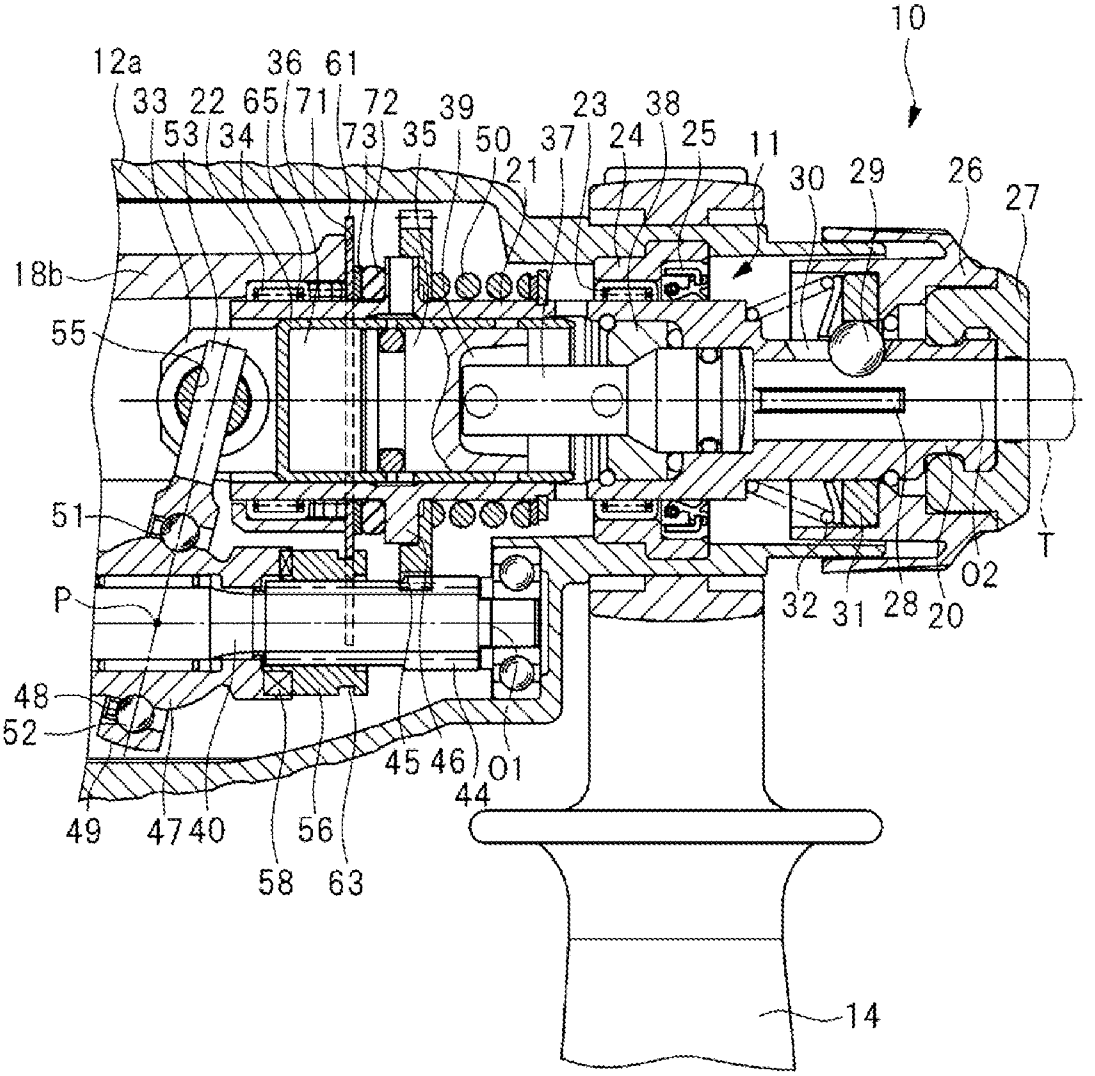
FIG. 7 is a cross-sectional view showing the application state of the load to the cylinder that has been pushed by the tip tool in a state in which the hammer drill mode is set.

Therefore, when the cylinder 21 is moved rearward by the pressing of the tip tool T against the workpiece, the engagement avoiding groove 69 of the switching member 61 passes outside the engaging protrusion 68. In this manner, as shown in FIG. 7, the switching member 61 abuts on the preventing part 71 of the inner case 18. By the abutment of the switching member 61 to the preventing part 71, the further rearward movement of the cylinder 21 is prevented. Further, since the clutch 56 is meshed with the motion converting member 47 by the switching member 61, the rotation of the output shaft 42 of the electric motor 13 is also transmitted to the motion converting member 47 by the driving shaft 40.

The driving rod 53 is swung around the center point P by the rotation of the motion converting member 47, and the piston 33 is reciprocated in the axis direction by the swinging motion of the driving rod 53. In the reciprocation of the piston 33, the striking element 35 is driven to protrude forward by the compressed air inside the air chamber 36, and collides with the intermediate element 37. In this manner, the striking force is applied to the tip tool T. The cylinder 21 is rotationally driven by the driving shaft 40, the striking force and the rotational force are applied to the tip tool T, and the punching work is performed at the same time as the application of the striking force to the workpiece by the tip tool T.

In such a hammer drill mode, the striking force that has been applied from the tip tool T to the workpiece returns as a counteraction from the workpiece to the intermediate element 37, and is transmitted to the cylinder 21, and the cylinder 21 becomes the vibration generating source. Since the rubber annular member 72 that is the anti-vibration part is arranged between the pushing part 46 of the cylinder 21 and the switching member 61, the impact force and the vibration applied to the cylinder are absorbed by the rubber annular member 72 arranged between the pushing part 46 and the switching member 61, so that the impact force and the vibration transmitted from the switching member 61 to the housing 12 through the inner case 18 are damped. In this manner, the impact force and the vibration transmitted to the operator's hand(s) holding the handle part 12*c* are reduced, so that the workability of the driving work machine 10 can be improved.

Each of FIGS. 8 to 12 is a cross-sectional view showing a principal part of the driving work machine 10 according to another embodiment. In each drawing, members having a commonality are denoted with the same reference character.

Figure 8:
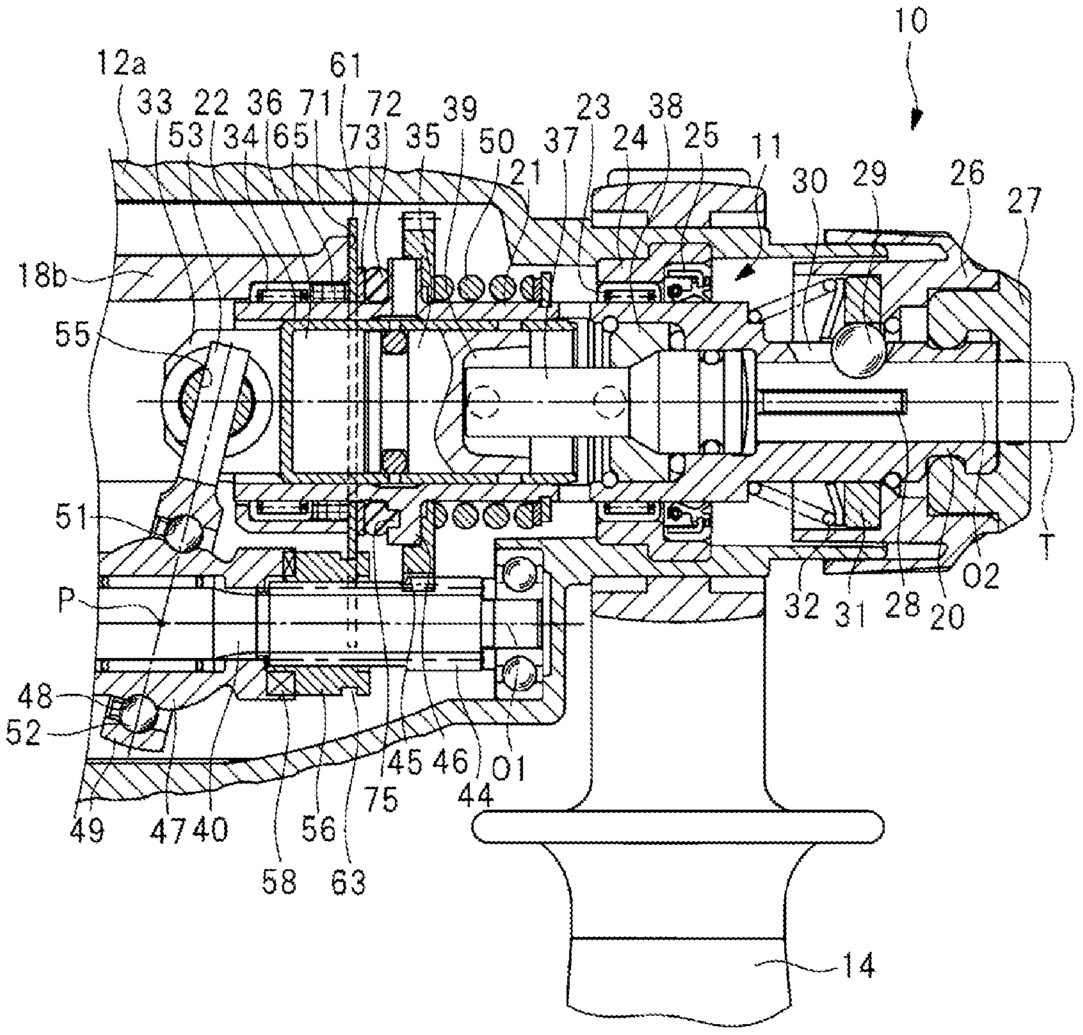
FIG. 8 is a cross-sectional view showing a principal part of a driving work machine according to another embodiment, and showing the state in which the hammer drill mode is set.
Figure 9:
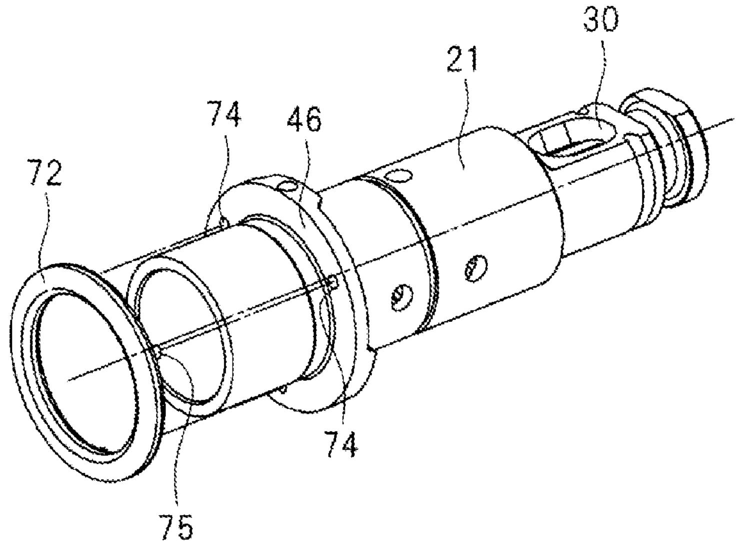
FIG. 9 is an exploded perspective view of a cylinder and an annular member shown in FIG. 8.

In a driving work machine 10 shown in FIG. 8, the pushing part 46 of the cylinder 21 has a plurality of fitting holes 74 that separate from one another in a circumferential direction at a predetermined separate distance as shown in FIG. 9, and the annular member 72 has a fitting protrusion 75 serving as a fitting part that fits with the fitting hole 74. By the fitting of the fitting protrusion 75 of the annular member 72 serving as the anti-vibration part with the fitting hole 74, the annular member 72 is prevented from moving in the circumferential direction with respect to the cylinder 21. In this manner, even when the rotation of the cylinder 21 starts, the annular member 72 can be prevented from sliding with respect to the pushing part 46 of the cylinder 21, so that the durability of the annular member 72 can be enhanced.

Even when the annular member 72 has the fitting hole while the pushing part 46 has the fitting protrusion, the durability of the annular member can be similarly improved by the prevention of the movement of the annular member 72 with respect to to the cylinder 21.

Figure 10:
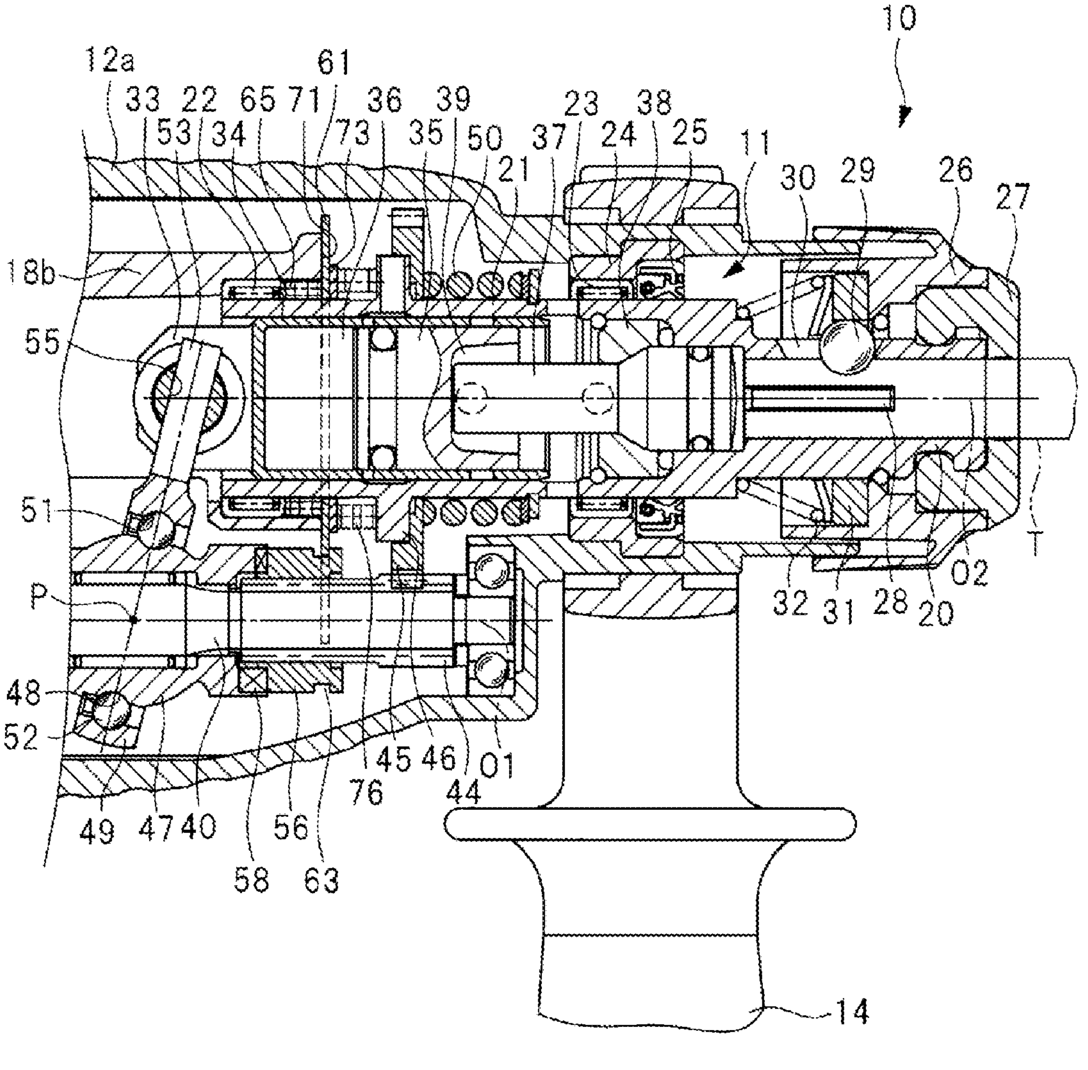
FIG. 10 is a cross-sectional view showing a principal part of a driving work machine according to still another embodiment, and showing the state in which the hammer drill mode is set.

In place of the annular member 72, a driving work machine 10 shown in FIG. 10 includes a compression coil spring 76 serving as the anti-vibration part between the pushing part 46 and the thrust washer 73. For this compression coil spring 76, a rectangular cross-sectional wire rod is used. The compression coil spring 76 may be fixed to the pushing part 46 so that the compression coil spring 76 does not move in the circumferential direction with respect to the cylinder 21.

Figure 11:
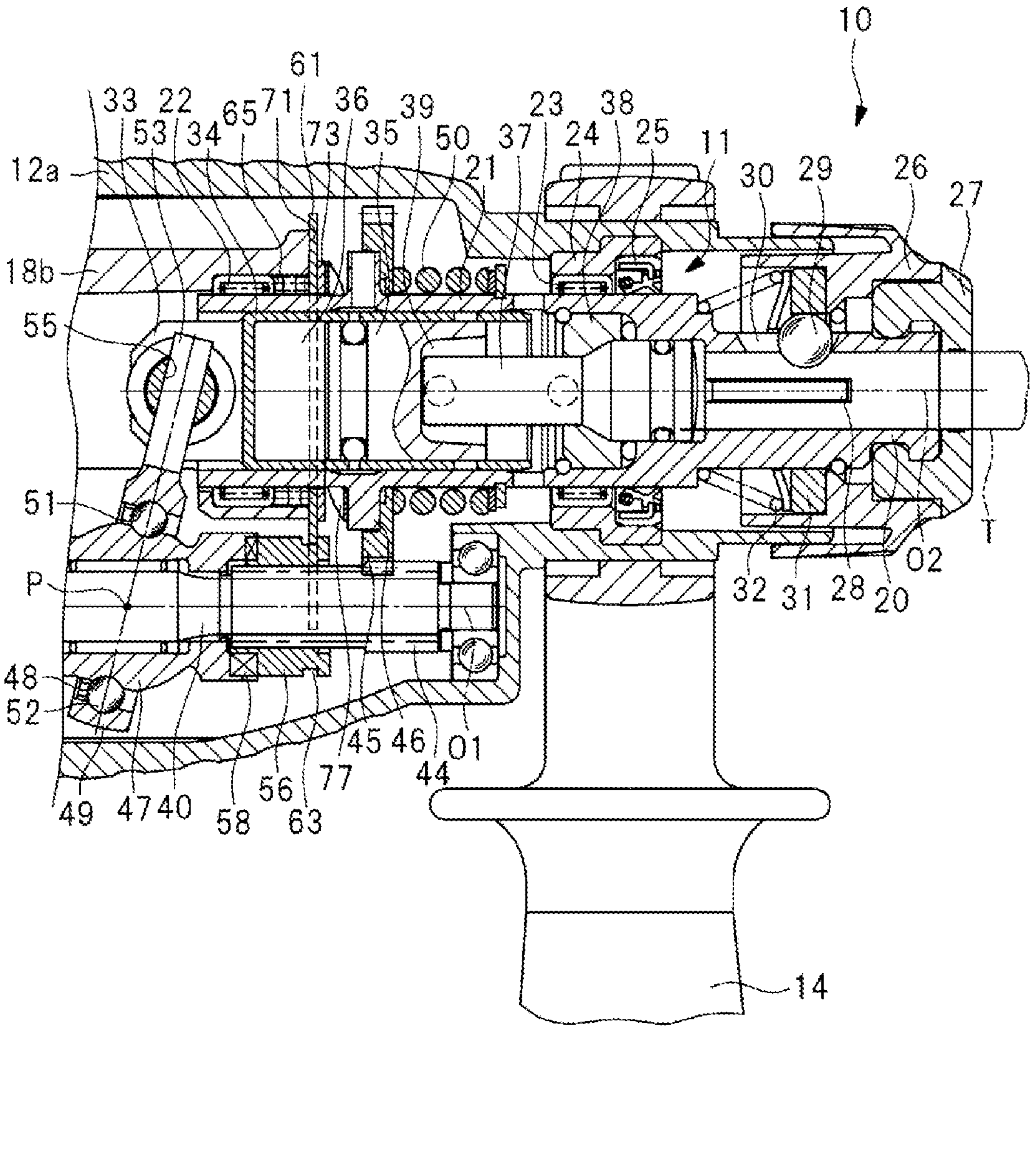
FIG. 11 is a cross-sectional view showing a principal part of a driving work machine according to still another embodiment, and showing the state in which the hammer drill mode is set.

In a driving work machine 10 shown in FIG. 11, a wave washer 77 serving as the anti-vibration part is attached to outside of the cylinder 21. The wave washer 77 extends along the circumferential direction to wind in the axis direction, and elastically deforms in the axis direction. In this manner, the vibration and the impact force of the cylinder 21 are absorbed between the pushing part 46 and the switching member 61.

Figure 12:
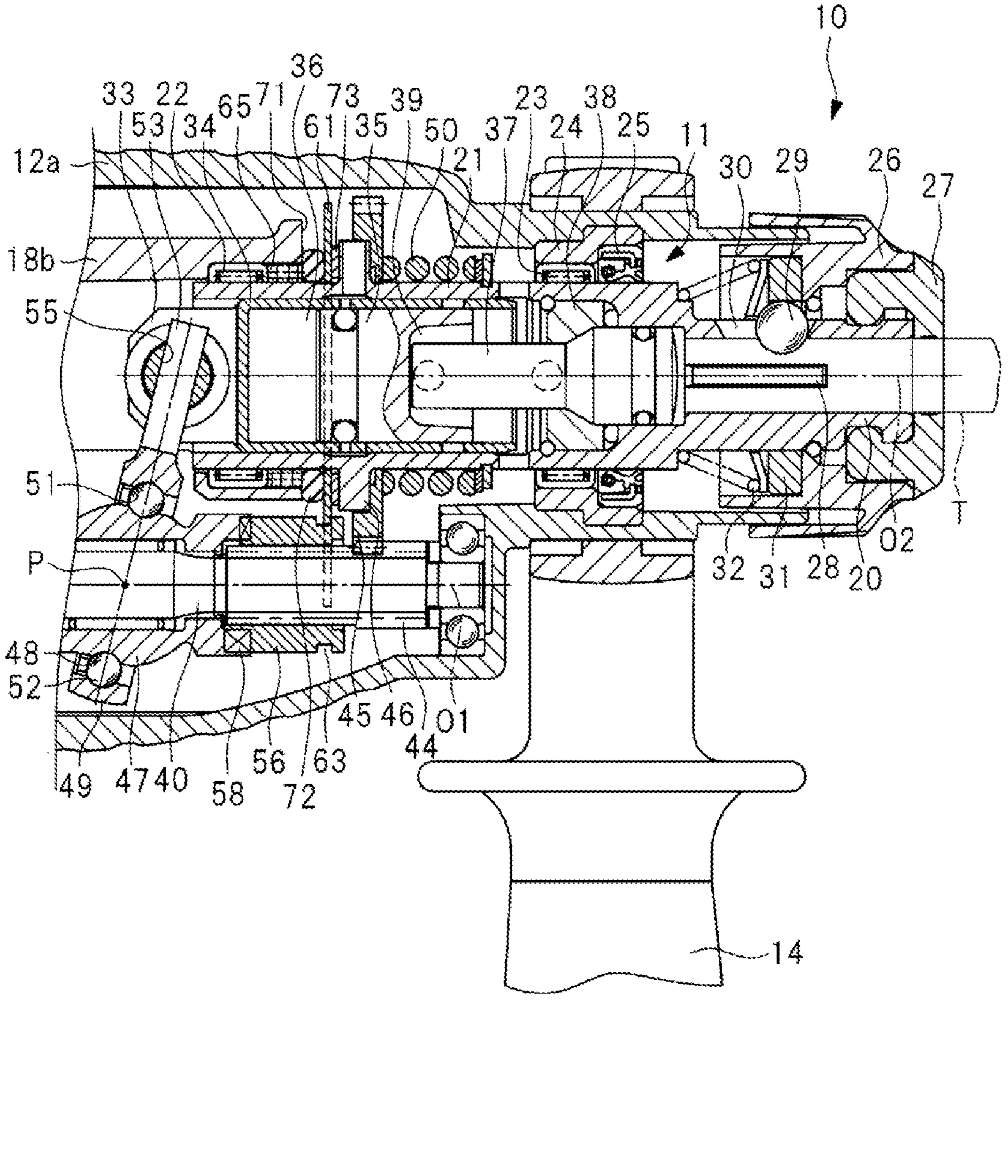
FIG. 12 is a cross-sectional view showing a principal part of a driving work machine according to still another embodiment, and showing the state in which the hammer drill mode is set.

In a driving work machine 10 shown in FIG. 12, the annular member 72 is arranged between the preventing part 71 and the switching member 61. By the arrangement of the anti-vibration part between the preventing part 71 and the switching member 61 as described above, the vibration and the impact transmitted from the cylinder 21 to the housing 12 can be also moderated.

The present invention is not limited to the foregoing embodiments, and various modifications can be made within the scope of the present invention. For example, the driving work machine 10 of the embodiments can be switched between the two operational states that are the drill mode and the hammer drill mode. However, the present invention is also applicable to the driving work machine having the hammer mode as described in the Patent Document 1 in addition to these modes. In other words, the present invention is applicable to the driving work machine at least having the two modes that are the drill mode and the hammer drill mode.

EXPLANATION OF REFERENCE CHARACTERS

10 . . . driving work machine, 11 . . . striking mechanism, 12 . . . housing, 12*a* . . . gear housing, 12*b* . . . motor housing, 12*c* . . . handle part, 13 . . . electric motor (driving source), 18 . . . inner case, 20 . . . tool fitting part, 21 . . . cylinder, 26 . . . tool holding part, 27 . . . holding ring, 32 . . . spring member, 34 . . . cylindrical part, 35 . . . striking element, 36 . . . air chamber, 37 . . . intermediate element, 40 . . . driving shaft, 46 . . . pushing part, 47 . . . motion converting member, 49 . . . follower ring, 52 . . . ball, 53 . . . driving rod, 54 . . . rotational piece, 56 . . . clutch, 61 . . . switching member, 62 . . . fitting hole, 63 . . . annular groove, 64 . . . engaging part, 65 . . . return spring member, 66 . . . switch lever, 67 . . . mode setting plate, 68 . . . engaging protrusion, 69 . . . engagement avoiding groove, 71 . . . preventing part, 72 . . . annular member, 73 . . . thrust washer, 74 . . . fitting hole, 75 . . . fitting protrusion, 76 . . . compression coil spring, 77 . . . wave washer

The invention claimed is:

1. A driving work machine comprising:

a cylinder configured to apply a rotational force to a tip tool;

a piston attached to be able to reciprocate in an axis direction inside the cylinder and configured to apply a striking force to the tip tool;

a driving source configured to generate a power for driving the cylinder and the piston;

a switching part configured to make switching between at least two operational states including a rotational striking state of transmitting the power as a striking force and a rotational force to the tip tool and a rotational state of transmitting the power as the rotational force but not transmitting the power as the striking force to the tip tool;

a housing configured to house the cylinder, the driving source and the switching part; and a spring member arranged between the housing and the switching part and configured to urge the switching part to move forward, wherein the cylinder includes a pushing part pushing the switching part rearward when the cylinder is moved rearward by a reactive force of the pressing of the tip tool against a workpiece, wherein the switching part is configured to switch an operational state of the cylinder in response to the pushing part pushing the switching part, wherein the housing includes a preventing surface configured to prevent an amount of the rearward movement of the switching part, wherein the driving work machine further comprises an anti-vibration part in addition to the spring member, the anti-vibration part being arranged between the pushing part and the preventing surface, wherein the anti-vibration part remains between the pushing part and preventing surface when the preventing surface prevents the rearward movement of the switching part, and wherein the anti-vibration part is arranged between the switching part and the pushing part.

2. The driving work machine according to claim 1 further comprising:

a driving shaft arranged inside the housing to be along the cylinder and configured to be rotationally driven by the driving source;

a motion converting part arranged in the driving shaft and configured to convert a rotational force of the driving shaft into a reciprocating force; and a clutch attached to the driving shaft to be movable in an axis direction and configured to make switching between a state of transmitting a power of the driving shaft to the motion converting part and a state of cutting the transmission, wherein, in the switching part, at the time of the rearward movement, the switching is made so that the power is transmitted from the driving shaft to the motion converting member, by meshing of the clutch with the motion converting part.

3. The driving work machine according to claim 1, wherein the switching part has a plate shape extending in a direction orthogonal to the axis direction of the cylinder.

4. The driving work machine according to claim 1, wherein the anti-vibration part is a wave washer attached to outside of the cylinder.

5. The driving work machine according to claim 1, further comprising a washer disposed between the anti-vibration part and the switching part.

6. The driving work machine according to claim 1, wherein the spring member is a coil spring.

7. The driving work machine according to claim 1, wherein the spring member has a first length in the axis direction of the cylinder, wherein the anti-vibration part has a second length in the axis direction of the cylinder, and wherein the first length is greater than the second length.

8. A driving work machine comprising:

a cylinder configured to apply a rotational force to a tip tool;

a piston attached to be able to reciprocate in an axis direction inside the cylinder and configured to apply a striking force to the tip tool;

a driving source configured to generate a power for driving the cylinder and the piston;

a switching part configured to make switching between at least two operational states including a rotational striking state of transmitting the power as a striking force and a rotational force to the tip tool and a rotational state of transmitting the power as the rotational force but not transmitting the power as the striking force to the tip tool;

a housing configured to house the cylinder, the driving source and the switching part; and a spring member arranged between the housing and the switching part and configured to urge the switching part to move forward, wherein the cylinder includes a pushing part pushing the switching part rearward when the cylinder is moved rearward by a reactive force of the pressing of the tip tool against a workpiece, wherein the switching part is configured to switch an operational state of the cylinder in response to the pushing part pushing the switching part, wherein the housing includes a preventing surface configured to prevent an amount of the rearward movement of the switching part, wherein the driving work machine further comprises an anti-vibration part in addition to the spring member, the anti-vibration part being arranged between the pushing part and the preventing surface, wherein the anti-vibration part remains between the pushing part and preventing surface when the preventing surface prevents the rearward movement of the switching part, and wherein the anti-vibration part is a rubber annular member fitted with an outer circumferential surface of the cylinder.

9. The driving work machine according to claim 8, wherein the annular member includes a fitting part that fits with the cylinder to prevent relative movement in a circumferential direction with respect to the cylinder.

10. The driving work machine according to claim 8, wherein the anti-vibration part is disposed between the pushing part and the switching part.

11. A driving work machine comprising:

a cylinder configured to apply a rotational force to a tip tool;

a piston attached to be able to reciprocate in an axis direction inside the cylinder and configured to apply a striking force to the tip tool;

a driving source configured to generate a power for driving the cylinder and the piston;

a switching part configured to make switching between at least two operational states including a rotational striking state of transmitting the power as a striking force and a rotational force to the tip tool and a rotational state of transmitting the power as the rotational force but not transmitting the power as the striking force to the tip tool;

a housing configured to house the cylinder, the driving source and the switching part; and a spring member arranged between the housing and the switching part and configured to urge the switching part to move forward, wherein the cylinder includes a pushing part pushing the switching part rearward when the cylinder is moved rearward by a reactive force of the pressing of the tip tool against a workpiece, wherein the switching part is configured to switch an operational state of the cylinder in response to the pushing part pushing the switching part, wherein the housing includes a preventing surface configured to prevent an amount of the rearward movement of the switching part, wherein the driving work machine further comprises an anti-vibration part in addition to the spring member, the anti-vibration part being arranged between the pushing part and the preventing surface, wherein the anti-vibration part remains between the pushing part and preventing surface when the preventing surface prevents the rearward movement of the switching part, and wherein the anti-vibration part is a coil spring attached to outside of the cylinder.

* * * * *